(12) United States Patent
Harte et al.

(10) Patent No.: US 6,640,889 B1
(45) Date of Patent: Nov. 4, 2003

(54) DUAL LOOP HEAT AND AIR CONDITIONING SYSTEM

(75) Inventors: Shane A. Harte, Farminton Hills, MI (US); Franck A. Vouzelaud, Paris (FR); David K. Johnson, Canton, MI (US); Thomas P. Gielda, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 75 days.

(21) Appl. No.: 10/090,652

(22) Filed: Mar. 4, 2002

(51) Int. Cl.[7] ............ F25B 29/00; B60H 1/32; B60H 1/00
(52) U.S. Cl. .......... 165/202; 165/240; 165/42; 165/43; 62/238.6; 62/238.7; 62/244; 62/434; 62/435; 62/323.1; 237/2 B; 237/12.3 B
(58) Field of Search ............ 165/202, 42, 43, 165/240; 62/238.6, 238.7, 434, 435, 244, 323.1; 237/2 B, 12.3 B

(56) References Cited

U.S. PATENT DOCUMENTS

| | | | | |
|---|---|---|---|---|
| 4,616,484 A | | 10/1986 | Mehdi et al. ............ 62/238.6 |
| 4,949,553 A | * | 8/1990 | Suzuki ............ 237/2 B |
| 5,211,023 A | | 5/1993 | Matsuura ............ 62/238.6 |
| 5,497,941 A | * | 3/1996 | Numazawa et al. ............ 165/43 |
| 5,549,153 A | * | 8/1996 | Baruschke et al. ............ 165/42 |
| 5,598,887 A | * | 2/1997 | Ikeda et al. ............ 165/202 |
| 5,678,761 A | * | 10/1997 | Ikeda ............ 237/2 B |
| 5,904,052 A | * | 5/1999 | Inoue et al. ............ 165/43 |
| 5,910,157 A | | 6/1999 | Noda ............ 62/238.7 |
| 6,047,770 A | * | 4/2000 | Suzuki et al. ............ 165/202 |
| 6,092,383 A | * | 7/2000 | Mertens ............ 62/238.6 |
| 6,233,957 B1 | | 5/2001 | Hirao et al. ............ 62/323.4 |

FOREIGN PATENT DOCUMENTS

| | | | |
|---|---|---|---|
| DE | 4341756 | * | 6/1985 |
| JP | 60-219114 | * | 11/1985 |
| JP | 60-236821 | * | 11/1985 |
| JP | 64-16423 | * | 1/1989 |
| JP | 6-143974 | * | 5/1994 |
| JP | 6-262936 | * | 9/1994 |
| JP | 8-91045 | * | 4/1996 |
| JP | 8-276727 | * | 10/1996 |
| JP | 9-113061 | * | 5/1997 |
| JP | 10-166847 | * | 6/1998 |
| JP | 11-286211 | * | 10/1999 |
| JP | 11-301254 | * | 11/1999 |
| JP | 2000-108640 | * | 4/2000 |

* cited by examiner

Primary Examiner—John K. Ford
(74) Attorney, Agent, or Firm—MacMillan, Sobanski & Todd, LLC

(57) ABSTRACT

A vehicle heating and cooling system having a first coolant loop selectively connecting an engine cooling system with a heater core or a first coolant/refrigerant heat exchanger, a second coolant loop connecting a second coolant/refrigerant heat exchanger and the heater core to warm a passenger compartment of the vehicle. The system also includes a refrigerant loop that provides for conventional cooling of the passenger compartment of the vehicle, as well as operating as a heat pump, together with the coolant loops, to provide heat to the vehicle passenger compartment.

17 Claims, 3 Drawing Sheets

DUAL LOOP HEAT AND AIR CONDITIONING SYSTEM

BACKGROUND OF INVENTION

The present invention relates to heating, ventilation and air conditioning systems for vehicles, and in particular to such systems having dual modes for providing heat to passenger compartments of the vehicles.

In a conventional automotive vehicle employing an internal combustion engine, the heating of the passenger compartment is accomplished by running engine coolant, typically a mix of water and glycol (antifreeze), through a heater core in the passenger compartment, and then blowing air over the heater core and onto the passengers. The drawback with this is that the heater core will not provide heat until the engine has caused the coolant to warm up. For most conventional engines, this time to warm up the coolant is sufficiently short to satisfy the vehicle passengers.

Now, however, newer engines and powertrain arrangements are being developed where the engine does not produce as much excess heat for the coolant to absorb. Some examples are a direct injection engine and a hybrid (engine/motor) powertrain. For these types of powertrains, the temperature of the coolant can take a very long time to rise to a level where it will allow for adequate heating of the passenger compartment when using a conventional heating system.

Most automotive vehicles today also include an air conditioning system for cooling the air in the passenger compartment. The air conditioning system can begin to operate almost as soon as the vehicle is started. Some, then, have recognized that the components of the air conditioning system can be employed to operate in a heat pump mode, and so the conventional coolant based heating system is replace with heat from the heat pump operation. But these systems become less and less efficient for heating as the ambient air temperature becomes colder. Consequently, they have not proven efficient enough to provide an adequate heating function to replace the current type of heating system.

Thus, it is desirable to have a vehicle heating and cooling system that overcomes the drawbacks of conventional vehicle heating, and heat pump systems in order to warm a vehicle passenger compartment more quickly.

SUMMARY OF INVENTION

In its embodiments, the present invention contemplates a heating and cooling system for a vehicle having an engine and a passenger compartment. The heating and cooling system includes a first coolant loop having a coolant outlet line and a coolant inlet line adapted to couple to the engine, a heater core, a first heat exchanger, and a coolant valve for selectively directing flow of a coolant from the coolant outlet line to the coolant inlet line through one of the heater core and the first heat exchanger. The system also includes a second coolant loop having a pump for selectively circulating the coolant through a first coolant/refrigerant heat exchanger, the heater core, and back to the pump. There is also a refrigerant loop having a compressor with an inlet and an outlet, a first refrigerant valve for selectively directing the flow of a refrigerant from the compressor outlet to one of a condenser and the first coolant/refrigerant heat exchanger, a refrigerant passage for directing the flow of the refrigerant through an evaporator, and a refrigerant line for returning the refrigerant to the compressor inlet.

The present invention further contemplates a method of providing heating and cooling to a passenger compartment of a vehicle having an engine, the method comprising the steps of: selectively circulating a coolant from the engine, through one of a heater core located in the passenger compartment and a first coolant/refrigerant heat exchanger, and back to the engine; selectively circulating the coolant from a pump, through a second coolant/refrigerant heat exchanger, and back to the pump; selectively circulating a refrigerant from a compressor and back to the compressor through one of a first refrigerant path, having a condenser, and evaporator, and an expansion valve between the condenser and the evaporator, and a second refrigerant path, having the second coolant/refrigerant heat exchanger, the first coolant/refrigerant heat exchanger, and the expansion valve between the second coolant/refrigerant heat exchanger and the first coolant/refrigerant heat exchanger.

An advantage of the present invention is that the vehicle heating and cooling system can operate in a conventional air conditioning mode, with cooling efficiencies essentially as good as with a conventional air conditioning system, and yet still operate in a heat pump mode to provide supplemental heating when the conventional heating system is not up to an efficient operating temperature.

Another advantage of the present invention is that, in the heat pump mode of operation, the coolant absorbs heat from the refrigerant in the heat pump system, which is more efficient than absorbing heat from the ambient air.

A further advantage of the present invention is that the heating and cooling system can operate in all three modes with a minimum of heat exchangers, valves and other system components, thus minimizing the cost of the system.

DETAILED DESCRIPTION

Figure 1:
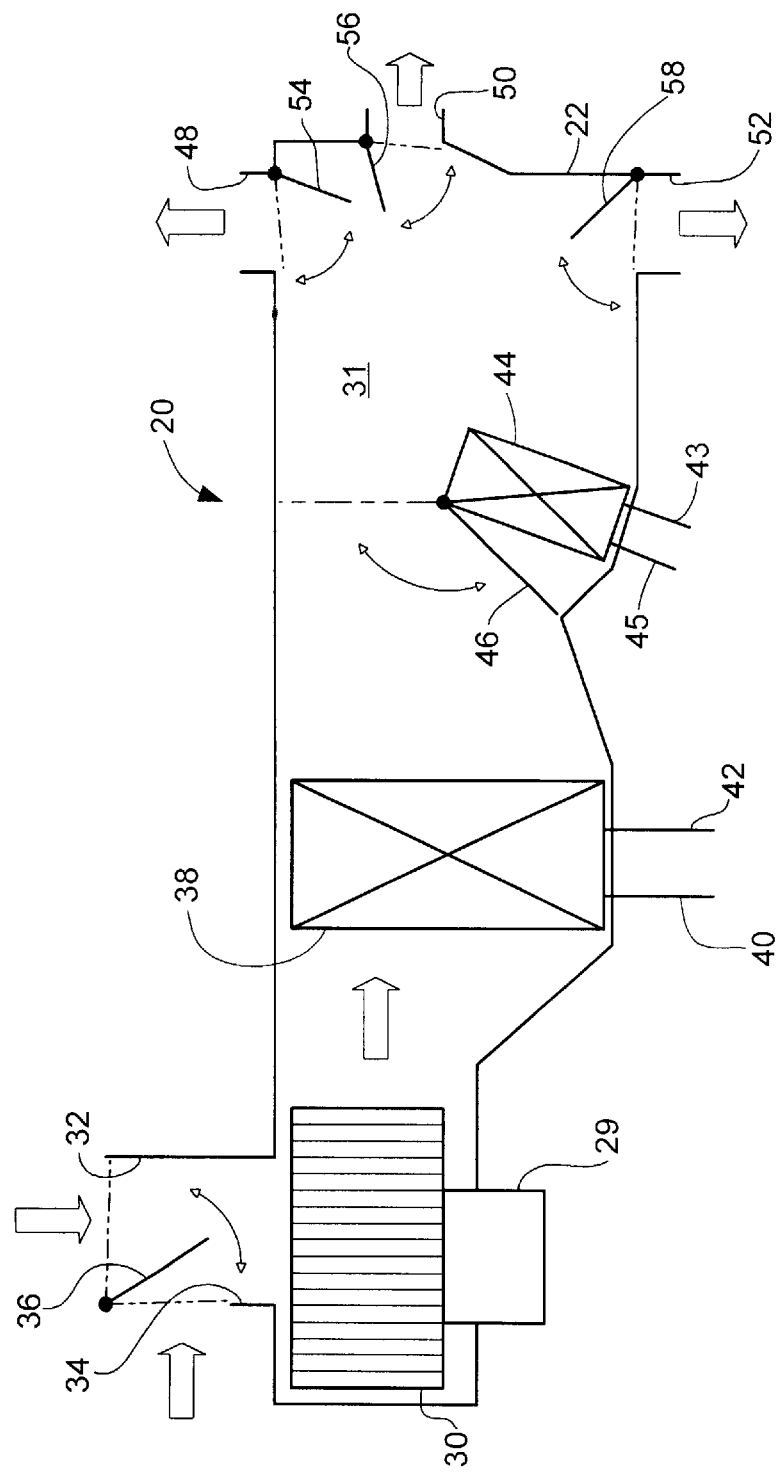
FIG. 1 is a schematic diagram of a portion of a heating and cooling system that is located in a passenger compartment of a vehicle, in accordance with the present invention.
Figure 2:
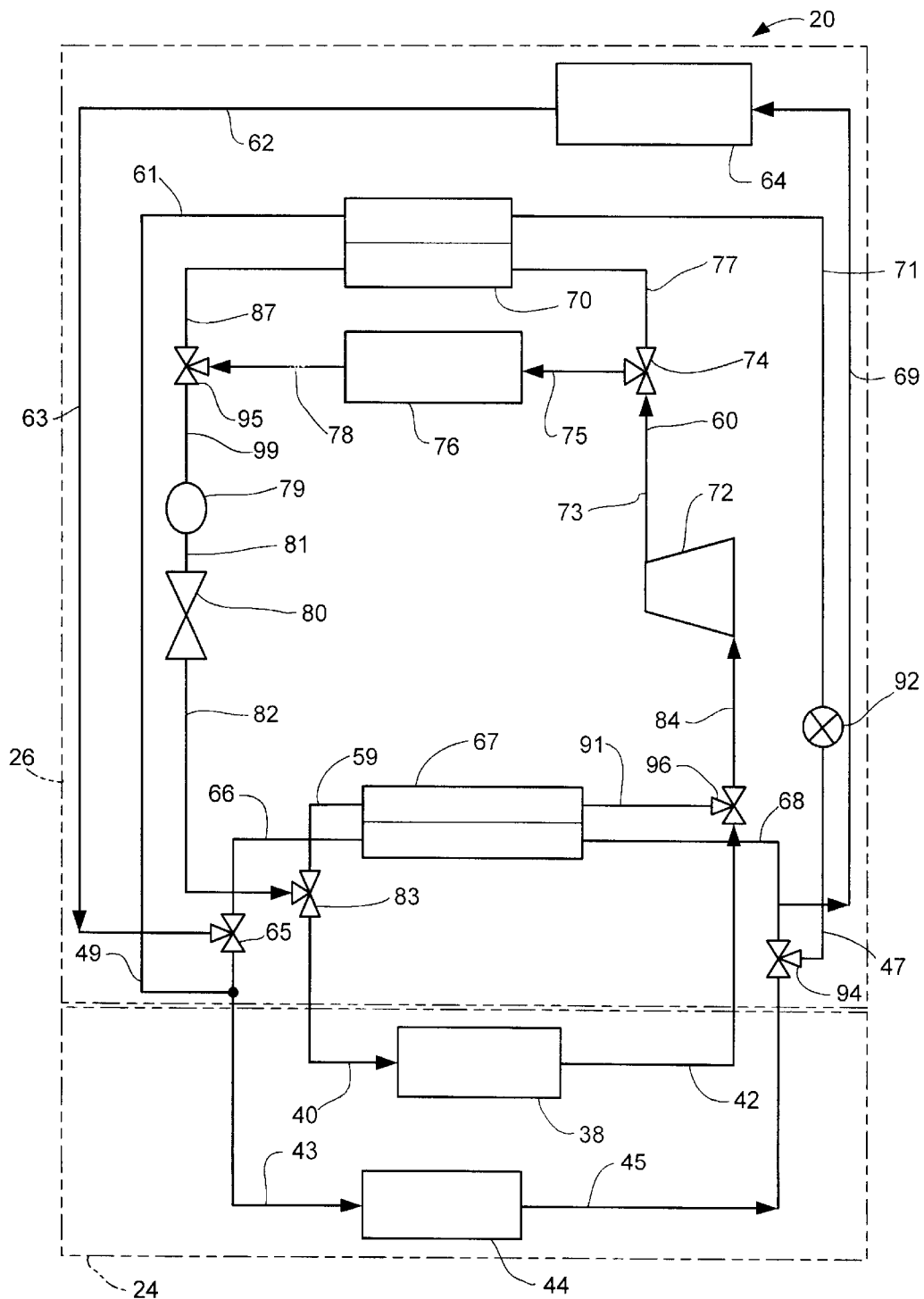
FIG. 2 is a schematic diagram of the vehicle heating and cooling system, illustrating the direction of fluid flow during a cooling cycle, in accordance with the present invention.
Figure 3:
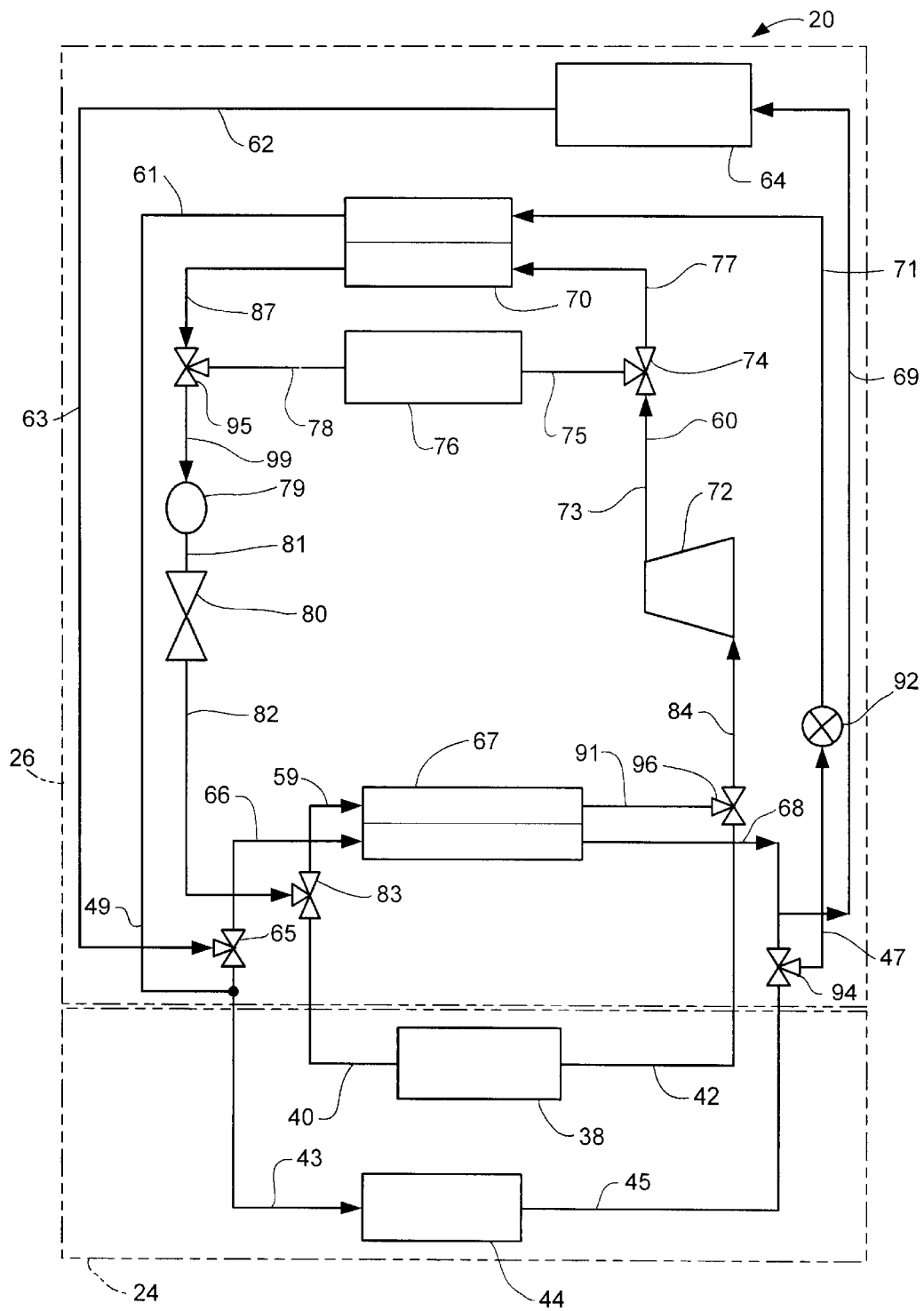
FIG. 3 is a schematic diagram similar to FIG. 2, but illustrating the direction of fluid flow during a heat pump cycle.

FIGS. 1–3 illustrate a vehicle heating and cooling system 20 that is partially located behind an instrument panel 22 in a vehicle passenger compartment 24, and partially in a vehicle engine compartment 26. The system 20 includes a blower 30, driven by a motor 29, and mounted in an air passage 31 in the passenger compartment 24. The blower 30 is located adjacent to an external air inlet 32, an internal air inlet 34, and an air mixing damper 36 that can be moved to partially or fully block off the external air inlet 32 or the internal air inlet 34 from the air passage 31.

Also located in the air passage 31, near the blower 30, is an evaporator 38. The evaporator 38 includes a pair of refrigerant lines 40 and 42 for directing refrigerant into and out of the it. The refrigerant in the lines 40, 42 may be any type of refrigerant found in air conditioning or refrigeration systems, such as, for example, R134a. A heater core 44 is located in the air passage 31, as well as a second air mixing damper 46, which can be moved to allow air flow through the heater core 44, block air flow from the heater core 44, or allow for a partial flow. An engine coolant intake line 43 and an engine coolant outlet line 45 connect to the heater core 44. The engine coolant in these lines 43, 45 may be any type of coolant found in engine cooling systems, such as, for example, a mixture of water and glycol. The heater core 44, then, is an air/coolant heat exchanger.

The air passage 31 also includes three air outlets 48, 50 and 52, with three corresponding dampers 54, 56 and 58 that can be adjusted to vary the flow through each of the air outlets 48, 50, 52. These air outlets may be, for example, an outlet 48 directed toward a vehicle windshield (not shown) for defrosting, an outlet 50 directed toward the bodies of vehicle occupants (not shown), and an outlet 52 directed toward the feet of vehicle occupants.

The heating and cooling system 20 includes three main loops—there is a refrigerant loop 60, a first coolant loop 62, and a second coolant loop 61. The first coolant loop 62 includes an outlet line 63 coming from an engine 64 and leading to a coolant three-way valve 65. The three-way valve 65 also connects to the coolant intake line 43 of the heater core 44, and to an intake line 66 to coolant passages in a first coolant/refrigerant heat exchanger 67. The coolant outlet line 45 from the heater core 44 connects to a coolant three-way valve 94, which then connects to a coolant outlet line 68 from the heat exchanger 67. The coolant line 68 connects to a coolant inlet line 69 running back to the engine 64. The coolant is pumped through the coolant loop 62 with a conventional water pump (not shown), which is part of a conventional engine cooling system (not shown) including a radiator, fan, etc.

The second coolant loop 61 includes a second coolant/refrigerant heat exchanger 70 which connects to a coolant line 49, which, in turn, connects to the coolant intake line 43. The second heat exchanger 70 also connects to a coolant line 71. The other end of the coolant line. 71 connects to the outlet of a water pump 92. The inlet to the water pump 92 connects a coolant line 47, which connects to coolant line 45 via three-way valve 94. The water pump 92 can be electrically or mechanically powered, and only needs to operate when the heating and cooling system 20 is in a heat pump mode, as will be discussed in more detail below.

The refrigerant loop 60 includes a compressor 72. The compressor 72 may be any one of several different types (for example, piston, swash plate, scroll), it may be driven by the engine 64 or by a separate motor, and it may have a clutch to disconnect it from the engine or motor or-it may be a variable capacity type, as may be desired depending upon the particular vehicle and engine. The compressor 72 connects to a compressor outlet line-73 which leads to a first refrigerant three-way valve 74. The three-way valve 74 also connects to a condenser inlet line 75 that leads to a condenser 76, and to a refrigerant line 77 that leads to refrigerant tubes in the second coolant/refrigerant heat exchanger 70. The second coolant/refrigerant heat exchanger 70 also connects to a refrigerant outlet line 87, which connects to a refrigerant three-way valve 95. The three-way valve 95 also connects to the inlet of a receiver/drier 79 via refrigerant line 99. The condenser connects to a refrigerant outlet line 78, which connects to three-way valve 95. The receiver/drier 79 connects to an expansion valve 80, via a refrigerant line 81, and the expansion valve 80, in turn, connects to a second refrigerant three-way valve 83, via refrigerant line 82. The second three-way valve 83 can direct refrigerant to the evaporator 38, via refrigerant line 40, or to the first coolant/refrigerant heat exchanger 67, via refrigerant line 59. Refrigerant line 91 connects the outlet of the first coolant/refrigerant heat exchanger 67 to a three-way valve 96. Three-way valve 96 connects to the inlet to the compressor 72 via refrigerant line 84. The refrigerant line 42 also connects the outlet from the evaporator 38 to the three-way valve 96.

The operation of the first embodiment, illustrated in FIGS. 1–3, will now be discussed. There are three different modes of operation for the heating and cooling system 20. The first mode is the cooling (air conditioning) mode. The flow of the refrigerant and the coolant for this mode is illustrated by the arrows in FIG. 2.

The refrigerant is compressed by the compressor 72 and flows into the first refrigerant three-way valve 74, which directs it into the condenser 76 via condenser inlet line 75. The three-way valve 74 is closed to line 77. The action of the compressor 72 in compressing the refrigerant causes the refrigerant temperature to rise. Ambient air flowing through the condenser 76 will absorb heat from the refrigerant. The refrigerant will then flow through the condenser outlet line 78, through three-way valve 95, and through the receiver/drier 79. The refrigerant then flows, via refrigerant line 81, into the expansion valve 80. The expansion valve 80 will regulate the pressure of the refrigerant, and thus, the temperature of the refrigerant leaving the expansion valve 80. This refrigerant will pass through outlet line 82, the second refrigerant three-way valve 83, through the refrigerant line 40 and into the evaporator 38. The second three-way valve 83 will be closed to refrigerant line 59. The blower 30 forces air across the evaporator 38, which will absorb heat from the air before the air flows into the passenger compartment 24. The refrigerant will flow out of the evaporator 38, via refrigerant lines 42 and 84, and back to the compressor 72. Three-way valve 96 will block refrigerant flow into line 91. So in the cooling mode, the system 20 operates essentially the same as with a conventional vehicle air conditioning system.

In the first mode of operation, the engine coolant in the first coolant loop 62 flows from the engine 64, through the outlet line 63, through the coolant three-way valve 65, through coolant intake line 43 and into the heater core 44. The coolant three-way valve 65 is closed to line 66. While the blower 30 will create air flow within the air passage 31, the damper 46 is closed and so the air entering the passenger compartment 24 will not pass over the heater core 44. Thus, the coolant will have only a vary negligible effect on the temperature of the air flowing into the passenger compartment 24. From the heater core 44, the coolant flows through coolant outlet line 45, through three-way valve 94, through a portion of coolant line 68, through coolant engine inlet line 69, and back to the engine. The coolant flow within the engine 64 and radiator (not shown) will not be discussed since it is conventional. In the second coolant loop 61, the water pump 92 is preferably off, and so no coolant will flow.

The second mode of operation is the heat pump mode. The direction of flow of refrigerant and coolant for this mode is illustrated in FIG. 3. This mode is employed when the engine and coolant is still cool, but the passenger compartment 24 needs to be warmed. In this mode, the refrigerant flows through the compressor 72, where it is compressed, and to three-way valve 74 via compressor outlet line 73. The three-way valve 74 directs the refrigerant into refrigerant line 77, and blocks the flow into condenser inlet line 75. The compressed refrigerant then flows into the second coolant/refrigerant heat exchanger 70. The refrigerant, being at a higher temperature than the coolant in the second coolant loop 61, will transfer heat to the coolant. The second coolant/refrigerant heat exchanger 70, in effect, acts as a condenser. The refrigerant then flows through three-way valve 95, through the receiver/drier 79 and the expansion valve 80 before it passes through the second refrigerant three-way valve 83. The three-way valve 95 is closed to line 78. The second three-way valve 83 directs the refrigerant into the first coolant/refrigerant heat exchanger 67, but blocks the flow to the evaporator 38. Since the refrigerant will now generally be at a lower temperature than the coolant in the first coolant loop 62, it will absorb heat before leaving the first coolant/refrigerant heat exchanger 67, flowing through three-way valve 96, and back to the compressor 72. The three-way valve 96 is closed to line 42.

In this heat pump mode of operation, the coolant flows in the first coolant loop 62 from the engine 64, through the coolant outlet line 63 and into the coolant three-way valve 65. The three-way valve 65 directs the flow of coolant into heat exchanger intake line 66, but blocks it from flowing into coolant intake line 43. The coolant then flows through the coolant/refrigerant heat exchanger 67. As mentioned above, as the coolant flows through this heat exchanger it will give off heat to the refrigerant. The coolant then flows through coolant line 68, through the coolant line 69 and back to the engine.

In this heat pump mode of operation, coolant also flows in the second coolant loop 61. The water pump 92 is activated and pumps coolant through coolant line 71 and into the second coolant/refrigerant heat exchanger 70. As mentioned above, since the refrigerant is at a higher temperature, the coolant will absorb heat from the refrigerant. This coolant, now warmed, then flows through coolant line 49, through coolant line 43, and into the heater core 44 in the passenger compartment 24. The blower 30 forces air through the heater core 44, warming the air before it flows into the passenger compartment 24. So in this heat pump mode, the heater core 44 gives off the heat absorbed by the coolant from the refrigerant in the second, coolant/refrigerant heat exchanger 70.

The third mode of operation is a conventional heating mode. This mode occurs when the coolant in the engine is hot and it is desired to add heat to the passenger compartment 24. In this mode, the compressor 72 is not operating, so the refrigerant is not flowing. Also, the water pump 92 is off, so the coolant in the second coolant loop 61 is not flowing. The coolant in the first coolant loop 62 flows the same as in the cooling mode, as discussed above. But the damper 46 is now open, so air flowing through the passage 31 will pass through the heater core 44 and be warmed before it enters the passenger compartment.

While certain embodiments of the present invention have been described in detail, those familiar with the art to which this invention relates will recognize various alternative designs and embodiments for practicing the invention as defined by the following claims.

What is claimed is:

1. A heating and cooling system for a vehicle having an engine and a passenger compartment, the heating and cooling system comprising:
   a first coolant loop having a coolant outlet line and a coolant inlet line adapted to couple to the engine, a heater core, a first heat exchanger, and a coolant valve for selectively directing flow of a coolant from the coolant outlet line to the coolant inlet line through one of the heater core and the first heat exchanger;
   a second coolant loop having a pump for selectively circulating the coolant through a first coolant/refrigerant heat exchanger, the heater core, and back to the pump; and
   a refrigerant loop having a compressor with an inlet and an outlet, a first refrigerant valve for selectively directing the flow of a refrigerant from the compressor outlet to one of a condenser and the first coolant/refrigerant heat exchanger, a refrigerant passage for directing the flow of the refrigerant through an evaporator, and a refrigerant line for returning the refrigerant to the compressor inlet.

2. The heating and cooling system of claim 1 wherein the first heat exchanger is a second coolant/refrigerant heat exchanger, and the refrigerant loop further includes a second refrigerant valve located along the refrigerant passage for selectively directing the flow of the refrigerant to one of the evaporator and the second coolant/refrigerant heat exchanger.

3. The heating and cooling system of claim 2 further including an expansion valve for controlling the flow of the refrigerant between one of the condenser and the evaporator, and the first coolant/refrigerant heat exchanger and the second coolant/refrigerant heat exchanger.

4. The heating and cooling system of claim 3 further including a receiver/drier located in the refrigerant loop adjacent to the expansion valve.

5. The heating and cooling system of claim 1 further including an expansion valve for controlling the flow of refrigerant between one of the condenser and the evaporator, and the first coolant/refrigerant heat exchanger and the first heat exchanger.

6. The heating and cooling system of claim 5 further including a receiver/drier located in the refrigerant loop adjacent to the expansion valve.

7. The heating and cooling system of claim 1 wherein the evaporator is adapted to be located in the passenger compartment.

8. The heating and cooling system of claim 1 wherein the heater core is adapted to be located in the passenger compartment.

9. The heating and cooling system of claim 1 wherein the coolant valve is a three-way valve.

10. The heating and cooling system of claim 1 wherein the first refrigerant valve is a three-way valve.

11. A heating and cooling system for a vehicle having and engine and a passenger compartment, the heating and cooling system comprising:
   a first coolant loop having a coolant outlet line and a coolant inlet line adapted to couple to the engine, a heater core, a first coolant/refrigerant heat exchanger, and a coolant valve for selectively directing flow of a coolant from the coolant outlet line to the coolant inlet line through one of the heater core and the first coolant/refrigerant heat exchanger;
   a second coolant loop having a pump for selectively circulating the coolant through a second coolant/refrigerant heat exchanger, the heater core, and back to the pump; and
   a refrigerant loop having a compressor with an inlet and an outlet, a first refrigerant valve for selectively directing the flow of a refrigerant from the compressor outlet to one of a condenser and the second coolant/refrigerant heat exchanger, a second refrigerant valve for directing the flow of the refrigerant through one of an evaporator and the first coolant/refrigerant heat exchanger, and a refrigerant line for returning the refrigerant to the compressor inlet.

12. The heating and cooling system of claim 11 further including an expansion valve for controlling the flow of refrigerant between one of the condenser and the evaporator, and the second coolant/refrigerant heat exchanger and the first coolant/refrigerant heat exchanger.

13. The heating and cooling system of claim 12 further including a receiver/drier located in the refrigerant loop adjacent to the expansion valve.

14. The heating and cooling system of claim 13 wherein the evaporator is adapted to be located in the passenger compartment.

15. The heating and cooling system of claim 14 wherein the heater core is adapted to be located in the passenger compartment.

16. A method of providing heating and cooling to a passenger compartment of a vehicle having an engine, the method comprising the steps of:

selectively circulating a coolant from the engine, through one of a heater core located in the passenger compartment and a first coolant/refrigerant heat exchanger, and back to the engine;

selectively circulating the coolant from a pump, through a second coolant/refrigerant heat exchanger, the heater core and back to the pump;

selectively circulating a refrigerant from a compressor and back to the compressor through one of a first refrigerant path, having a condenser, and evaporator, and an expansion valve between the condenser and the evaporator, and a second refrigerant path, having the second coolant/refrigerant heat exchanger, the first coolant/refrigerant heat exchanger, and the expansion valve between the second coolant/refrigerant heat exchanger and the first coolant/refrigerant heat exchanger.

17. The method of claim 16 further including the step of circulating the refrigerant through a receiver/drier prior to circulating the refrigerant through the expansion valve.

* * * * *